(12) United States Patent
Allgaeuer et al.

(10) Patent No.: US 11,186,136 B2
(45) Date of Patent: Nov. 30, 2021

(54) COOLING APPARATUS FOR A MOTOR VEHICLE, AND MOTOR VEHICLE HAVING SUCH A COOLING APPARATUS

(71) Applicant: Bayerische Motoren Werke Aktiengesellschaft, Munich (DE)

(72) Inventors: Christian Allgaeuer, Munich (DE); Oliver Horn, Munich (DE); Martin Knott, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 304 days.

(21) Appl. No.: 16/372,874

(22) Filed: Apr. 2, 2019

(65) Prior Publication Data
US 2019/0225046 A1    Jul. 25, 2019

Related U.S. Application Data

(63) Continuation of application No. PCT/EP2017/076020, filed on Oct. 12, 2017.

(30) Foreign Application Priority Data

Oct. 19, 2016    (DE) ...................... 10 2016 220 474.2

(51) Int. Cl.
*F25B 41/00*    (2021.01)
*B60H 1/00*     (2006.01)
*B60H 1/32*     (2006.01)

(52) U.S. Cl.
CPC ......... *B60H 1/00278* (2013.01); *B60H 1/323* (2013.01); *B60H 2001/00307* (2013.01); *F01P 2060/08* (2013.01)

(58) Field of Classification Search
CPC ................ B60H 1/00278; B60H 1/323; B60H 2001/00307; F01P 2060/08
(Continued)

(56) References Cited

U.S. PATENT DOCUMENTS

| 5,186,013 A | * | 2/1993 | Durso | ................... F01D 15/005 62/115 |
| 2007/0044491 A1 | | 3/2007 | Prince et al. | |
| 2007/0251265 A1 | | 11/2007 | Kurata et al. | |

FOREIGN PATENT DOCUMENTS

| CN | 101063563 A | 10/2007 |
| DE | 10 2007 019 563 A | 11/2007 |

(Continued)

OTHER PUBLICATIONS

International Search Report (PCT/ISA/210) issued in PCT Application No. PCT/EP2017/076020 dated Jan. 31, 2018 with English translation (four (4) pages).

(Continued)

*Primary Examiner* — Davis D Hwu
(74) *Attorney, Agent, or Firm* — Crowell & Moring LLP

(57) ABSTRACT

A cooling apparatus for a motor vehicle includes a coolant circuit through which a coolant can flow, a coolant compressor, a first evaporator, at least one second evaporator, a first suction line for leading the coolant from the first evaporator to the coolant compressor, a second suction line, a main line connected fluidically to suction lines at a connecting point, and at least one internal heat exchanger, through which coolant flowing from the at least one of the evaporators to the coolant compressor can flow. The internal heat exchanger is arranged in at least one of the suction lines and the connecting point is arranged downstream of the at least one heat exchanger.

14 Claims, 2 Drawing Sheets

(58) Field of Classification Search
USPC .......................................................... 62/513
See application file for complete search history.

(56) References Cited

FOREIGN PATENT DOCUMENTS

| | | |
|---|---|---|
| DE | 10 2010 009 233 A1 | 9/2010 |
| DE | 10 2012 224 484 A | 7/2014 |
| EP | 2 796 812 A1 | 10/2014 |
| FR | 3 028 016 A | 5/2016 |
| JP | 2007-298196 A | 11/2007 |
| JP | 2008-51474 A | 3/2008 |
| WO | WO 2011/029538 A1 | 3/2011 |

OTHER PUBLICATIONS

German-language Written Opinion (PCT/ISA/237) issued in PCT Application No. PCT/EP2017/076020 dated Jan. 31, 2018 (six (6) pages).
German-language Office Action issued in counterpart German Application No. 10 2016 220 474.2 dated Jun. 23, 2017 with English translation (11 pages).
Chinese Office Action issued in Chinese application No. 201780055511.5 dated Aug. 31, 2020, with English translation (Thirteen (13) pages).

\* cited by examiner

COOLING APPARATUS FOR A MOTOR VEHICLE, AND MOTOR VEHICLE HAVING SUCH A COOLING APPARATUS

CROSS REFERENCE TO RELATED APPLICATIONS

This application is a continuation of PCT International Application No. PCT/EP2017/076020, filed Oct. 12, 2017, which claims priority under 35 U.S.C. § 119 from German Patent Application No. 10 2016 220 474.2, filed Oct. 19, 2016, the entire disclosures of which are herein expressly incorporated by reference.

BACKGROUND AND SUMMARY OF THE INVENTION

The invention relates to a cooling device for a motor vehicle and to a motor vehicle, in particular a car, having such a cooling device.

Cooling devices for motor vehicles, in particular for cars, are already well known from the general prior art and, in particular, from series vehicle production. The cooling device has a refrigerant circuit, through which a refrigerant can flow. Furthermore, the cooling device has a refrigerant compressor which is arranged in the refrigerant circuit and by which the refrigerant is to be compressed or can be compressed. Furthermore, the cooling device has a first evaporator which is arranged in the refrigerant circuit and by which the refrigerant can be evaporated. Furthermore, the cooling device has at least one second evaporator which is arranged in the refrigerant circuit and by which the refrigerant can be evaporated. By way of the evaporation of the refrigerant, the refrigerant can absorb heat, with the result that a thermal transfer from a medium which is different than the refrigerant and flows on, around or through the respective evaporator to the refrigerant can take place, for example, via the respective evaporator. As a result, the medium is cooled, with the result that, for example, at least one component and/or the interior compartment of the motor vehicle can be cooled by means of the medium. It is conceivable, in particular, that the medium is air which is fed, for example, to the interior compartment of the motor vehicle. By way of this, the interior compartment can be cooled.

Moreover, the cooling device includes a first suction line which is arranged in the refrigerant circuit and by which the refrigerant can be conducted or is conducted from the first evaporator to the refrigerant compressor. Furthermore, the cooling device includes a second suction line which is arranged in the refrigerant circuit, is separated at least partially from the first suction line, and by which the refrigerant can be conducted or (during operation of the cooling device) is conducted from the second evaporator to the refrigerant compressor.

Moreover, the cooling device has a main line which is arranged in the refrigerant circuit, is connected fluidically to the suction lines at a connecting point, and by which the refrigerant can be conducted from the suction lines to the refrigerant compressor. Therefore, in the flow direction of the refrigerant which flows from the respective evaporator to the refrigerant compressor, the main line is arranged between the connecting point and the refrigerant compressor and therefore between the refrigerant compressor and the suction lines. The refrigerant which flows through the respective suction lines can therefore flow out of the suction lines and, in particular at the connecting point, can flow into the main line, with the result that the refrigerant from the suction lines is collected in the main line. In other words, the suction lines are combined to form the main line, in particular at the connecting point, with the result that the refrigerant from the suction lines is combined in the main line.

Furthermore, the cooling device includes at least one heat exchanger which is arranged in the refrigerant circuit and through which the refrigerant which flows from at least one of the evaporators to the refrigerant compressor can flow. Therefore, the at least one heat exchanger is arranged between the at least one evaporator and the refrigerant compressor in the flow direction of the refrigerant which flows from the at least one evaporator to the refrigerant compressor. The result is that the refrigerant which flows from the at least one evaporator to the refrigerant compressor first of all flows through the at least one heat exchanger and then to or through the refrigerant compressor.

It is an object of the present invention to provide a cooling device and a motor vehicle having a cooling device of this type, with the result that particularly efficient and high performance operation of the cooling device can be realized.

A first aspect of the invention relates to a cooling device for a motor vehicle, in particular for a car, such as a passenger car. The cooling device comprises a refrigerant circuit, through which a refrigerant can flow, and a refrigerant compressor which is arranged in the refrigerant circuit, through which accordingly the refrigerant can flow, and by which the refrigerant can be compressed. In other words, during operation of the cooling device, the refrigerant is compressed by way of the refrigerant compressor, it also being possible for the refrigerant compressor to be simply called a compressor. Furthermore, the cooling device comprises a first evaporator which is arranged in the refrigerant circuit and by which the refrigerant can be evaporated. Moreover, the cooling device comprises at least one second evaporator which is arranged in the refrigerant circuit for evaporating the refrigerant. The refrigerant can flow through the respective evaporator, the refrigerant being evaporated by the respective evaporator during the abovementioned operation of the cooling device. By way of the evaporation of the refrigerant, the refrigerant can absorb heat, for example. As a result, for example, a thermal transfer can take place from a medium which flows on, around or through the respective evaporator and is different than the refrigerant via the respective evaporator to the refrigerant. The medium is, for example, a liquid or a gas, such as air. As a consequence of the thermal transfer from the medium to the refrigerant, the medium is cooled.

Furthermore, the cooling device comprises a first suction line which is arranged in the refrigerant circuit for conducting the refrigerant from the first evaporator to the refrigerant compressor. Moreover, the cooling device comprises a second suction line which is arranged in the refrigerant circuit and is separated at least partially from the first suction line for conducting the refrigerant from the second evaporator to the refrigerant compressor. Therefore, the refrigerant can flow through the respective suction line. After the refrigerant has been evaporated by way of the respective evaporator, the refrigerant is conducted by way of the respective suction line from the evaporator, in particular back, to the refrigerant compressor or in the direction thereof. Here, the cooling device comprises a main line which is arranged in the refrigerant circuit, through which the refrigerant can flow, and which is connected fluidically to the suction lines at a connecting point. As a result, the refrigerant which flows through the respective suction lines can flow, in particular at the connecting point, out of the respective suction lines and into the main line, with the result that, for example, the suction lines are combined to form the main line. In other words, the refrigerant from the suction lines is combined in the main line, the main line also being called, for example, a main section, and the respective suction line also being called a part section. By way of the main line, the refrigerant is conducted from the suction lines to the refrigerant compressor. Therefore, in the flow direction of the refrigerant which flows through the suction lines and flows from the respective evaporator to the refrigerant compressor, for example, the main line is arranged between the refrigerant compressor and the respective suction line, in particular between the refrigerant compressor and the connecting point. Therefore, on its path to the refrigerant compressor, the refrigerant flows, for example, first of all through the main line and then through the refrigerant compressor.

Furthermore, the cooling device comprises at least one heat exchanger which is arranged in the refrigerant circuit and through which the refrigerant which flows from at least one of the evaporators to the refrigerant compressor can flow. This means that the refrigerant which flows from the at least one evaporator back to the refrigerant compressor flows through the at least one heat exchanger. The result is that, for example, the refrigerant which flows from the at least one evaporator to the refrigerant compressor can be temperature controlled by way of the at least one heat exchanger, that is to say can be cooled and/or heated.

In order for it then to be possible for particularly efficient and, in particular, particularly low loss and high performance operation of the cooling device to be realized, it is provided according to the invention that the at least one heat exchanger is arranged in at least one of the suction lines, the connecting point being arranged downstream of the at least one heat exchanger. This means that, in the flow direction of the refrigerant which flows from the respective evaporator to the refrigerant compressor, the suction lines are combined only downstream of, or after, the at least one heat exchanger to form the main line. The result is that the refrigerant which flows through the respective suction lines is collected in the main line only after, or downstream of, the at least one heat exchanger. It is provided, in particular, that the evaporators are arranged or connected parallel to one another, with the result that the refrigerant flows through the evaporators in parallel during operation of the cooling device. Furthermore, in comparison to a conventional cooling device, an increase in the refrigeration performance and a lower specific power requirement of the compressor can be realized as a result.

The invention is based, in particular, on the following finding: in the main line which is also called the main section, high flow velocities can occur at high load points. High load points of this type occur, in particular, when the evaporators are in operation at the same time, with the result that at least two components or regions of the motor vehicle can be temperature controlled or climate controlled at the same time, for example, by means of the evaporators. Here, the flow pressure losses rise quadratically with the flow velocity of the refrigerant. This results in efficiency disadvantages in the case of conventional cooling devices, since the pressure losses have to be compensated for at least partially via a higher actuation of the refrigerant compressor. It is a further disadvantage that an impairment of comfort can occur, in particular in the interior compartment of the motor vehicle, in particular in the case of a full actuation of the refrigerant compressor. The pressure losses namely lead to a rise in the evaporation temperature. Said rise can be compensated for merely partially via higher fan quantities.

This in turn results in acoustic disadvantages and draft phenomena for occupants in the interior compartment. A further disadvantage is, for example, the impairment of a thermal transfer to a component which is to be temperature controlled, in particular is to be climate controlled, by means of one of the evaporators, such as an energy store, in particular in the case of a full actuation of the refrigerant compressor. Here, higher evaporation temperatures lead to an impaired thermal transfer from the component, in particular battery cells of the component, to the refrigerant.

The abovementioned problems and disadvantages can be avoided in the case of the cooling device according to the invention, since the described arrangement of the connecting point makes it possible to combine the suction lines only directly upstream of the refrigerant compressor and therefore makes it possible for the main section which is common to the suction lines to be of particularly short and streamlined configuration. Within the context of the streamlined refinement of the main section, the main section can be configured, for example, with a particularly great flow cross section, through which the refrigerant flows, in particular a particularly great diameter. It has been shown, however, that the flow cross section or the internal diameter cannot be selected to be arbitrarily large, since otherwise the flow velocity becomes too low in part load operation and therefore the oil return to the compressor is no longer ensured. The oil is entrained by the refrigerant during operation and serves to lubricate the compressor.

The suction lines which are configured, for example, as pipelines should in principle be laid in a simple manner and on as short a path as possible; oil traps are to be avoided. Pressure losses, flow velocities, oil return and flow noise are decisive for the pipe cross section.

Furthermore, sharp deflections can be avoided. Since the refrigerant from the suction lines is combined in the main section (main line), a total refrigerant mass flow flows through the main section. Here, for example, a first part mass flow of the refrigerant flows through the first suction line, and a second part mass flow of the refrigerant flows through the second suction line, the total refrigerant mass flow comprising the part mass flows and being formed, in particular, from the sum of the part mass flows which are combined in the main section. In other words, particularly advantageous flow conditions for the refrigerant which flows through the refrigerant circuit can be produced by way of the configuration of the cooling device according to the invention, with the result that an efficiency improvement of the refrigerant circuit which is also called a refrigeration circuit can be provided in comparison with conventional cooling devices. This means that pressure losses can be reduced in comparison with conventional cooling devices. Said lower pressure losses lead to a lower actuation of the refrigerant compressor. Furthermore, a performance increase of the cooling device can be realized, in particular in the case of a full actuation of the refrigerant compressor. This means that a higher refrigeration performance is available at a desired evaporation temperature.

If, for example, at least one of the evaporators is utilized to temperature control, in particular to climate control, the interior compartment of the motor vehicle, an improvement in comfort in the interior compartment can be realized by means of the cooling device according to the invention, in particular in the case of a full actuation of the refrigerant compressor. Here, low air-side discharge temperatures can be achieved on account of the low evaporation temperatures. In conjunction with the abovementioned component which is configured, for example, as an energy store and is to be temperature controlled, in particular is to be cooled, by means of at least one of the evaporators, it is possible to realize an improvement in a thermal transfer at the component, in particular in the case of a full actuation of the refrigerant compressor, lower evaporation temperatures leading to a particularly advantageous thermal transfer from the component to the refrigerant. Here, the invention utilizes the relationship between the pressure loss of the refrigerant and the evaporation temperature. Here, the pressure loss influences the evaporation temperature, with the result that the evaporation temperature can be reduced by way of a reduction of the pressure loss.

In one advantageous refinement of the invention, the at least one suction line, in which the at least one heat exchanger is arranged, is the first suction line. Therefore, the at least one heat exchanger is, for example, also called a first heat exchanger. It is provided here that a second heat exchanger is arranged in the second suction line, the connecting point being arranged downstream of the second heat exchanger. In other words, the connecting point is arranged downstream of the first heat exchanger and downstream of the second heat exchanger. Particularly efficient operation of the cooling device can be realized by way of the use of the respective heat exchanger.

It has been shown to be particularly advantageous here if the cooling device comprises a third evaporator which is arranged in the refrigerant circuit for evaporating the refrigerant. Furthermore, the cooling device has a third suction line which is arranged in the refrigerant circuit and by which the refrigerant can be conducted from the third evaporator to the refrigerant compressor. Here, the main line is utilized to conduct the refrigerant from the at least three suction lines, that is to say from the first suction line, from the second suction line and from the third suction line, to the refrigerant compressor, the main line being connected fluidically to the third suction line at a combining point. As a result, for example, the refrigerant which flows through the third suction line can flow out of the third suction line and into the main line, in particular at the combining point, with the result that the refrigerant from the respective suction lines is collected or combined in the main line. As described above in conjunction with the first and the second suction line, it is therefore also provided in this embodiment that the first suction line, the second suction line and the third suction line are combined to form the main line. Therefore, in the flow direction of the refrigerant which flows from the respective evaporator to the refrigerant compressor, the main line is arranged between the refrigerant compressor and the connecting point and between the refrigerant compressor and the combining point and therefore between the refrigerant compressor and the at least three suction lines. In order for it to be possible for particularly efficient operation to be realized here, the combining point is arranged downstream of the at least one heat exchanger and downstream of the second heat exchanger.

In order for it to be possible for the number of parts, the weight and the costs of the cooling device to be kept particularly low, it also being possible at the same time for particularly efficient operation to be realized, it is provided in a further embodiment of the invention that the second heat exchanger is a heat exchanger which is common to the second evaporator and the third evaporator and is arranged in the third suction line. In other words, the second heat exchanger is arranged both in the second suction line and in the third suction line.

A further embodiment is distinguished by the fact that a third heat exchanger is arranged in the third suction line, the connecting point and the combining point being arranged downstream of the third heat exchanger. In said embodiment, at least one heat exchanger is therefore provided per suction line, in order for it to be possible for particularly efficient operation of the cooling device to be provided as a result.

In order to realize particularly efficient operation, furthermore, it has been shown to be advantageous if the combining point coincides with the connecting point. In other words, the combining point corresponds to the connecting point or vice versa, with the result that the combining point is the connecting point or vice versa. As a result, unfavorable flows, in particular eddies, of the refrigerant which flows through the refrigerant circuit can be avoided, as a result of which particularly efficient and/or low loss operation of the cooling device is realized.

It has been shown to be particularly advantageous if the main line has an internal diameter, through which the refrigerant, in particular, flows, which internal diameter lies in a range from 14 millimeters inclusive to 20 millimeters inclusive. In other words, the internal diameter is preferably at least 14 millimeters and at most 20 millimeters. As a result, particularly advantageous flow conditions for the refrigerant can be realized. In particular, excessive losses can be avoided.

A further embodiment is distinguished by the fact that the main line has a length of at most 1000 millimeters. As a result, excessive losses can be avoided, with the result that an increase in the refrigeration performance and a lower specific power requirement of the compressor can be realized.

In a further refinement of the invention, the length of the main line is less than 500 millimeters, preferably less than 150 millimeters. As a result, an increase in the refrigeration performance and a lower specific power requirement of the compressor can be realized.

In a further refinement of the invention, the refrigerant which flows to at least one of the evaporators can flow through the heat exchanger. This means that the heat exchanger is an internal heat exchanger, through which both the refrigerant which flows to at least one of the evaporators and the refrigerant which flows from at least one of the evaporators back to the refrigerant compressor can flow. As a result, a heat exchange can be realized via the internal heat exchanger between the refrigerant which flows in the direction of one of the evaporators and the refrigerant which comes from at least one of the evaporators and flows from at least one of the evaporators to the refrigerant compressor, with the result that particularly efficient operation can be realized. The internal heat exchanger is therefore used to realize an efficiency and performance increase. The heat exchanger is configured, for example, as a field tube heat exchanger. In the case of conventional cooling devices, the internal heat exchanger is arranged in the main section, that is to say in the main line, which leads to efficiency disadvantages, however. Said efficiency disadvantages can be avoided in the case of the cooling device according to the invention. The internal heat exchanger is also called an inner heat exchanger and preferably has a specified heat-transferring surface area. This can be achieved both via the length and via the diameter. The diameter is limited, however, on account of installation space and weight restrictions and on account of oil return measures.

A further embodiment is distinguished by the fact that one of the evaporators is assigned to an energy store of the motor vehicle which is configured for storing electric energy, and the other one of the evaporators is assigned to the interior compartment of the motor vehicle, with the result that the energy store can be temperature controlled, in particular can be cooled, by means of the one evaporator, and the interior compartment can be temperature controlled, in particular can be cooled, by means of the other evaporator. The energy store is, for example, a battery. In particular, the energy store can be configured as a high voltage component (HV component), with the result that the energy store is configured, for example, as an HV energy store (high voltage energy store). A high voltage component of this type has an electric voltage, in particular an electric operating voltage, of more than 50 V, in particular of more than 100 V, the electric voltage of the high voltage component usually being several hundred volts.

A medium or cooling medium which is configured as a cooling liquid can be temperature controlled, in particular cooled, by means of the one evaporator, for example. The cooling medium can, for example, flow through the energy store, with the result that a thermal transfer can take place from the energy store to the cooling medium. As a result, the energy store is cooled, the cooling medium being heated. The cooling medium can be cooled again as a consequence of a thermal transfer from the cooling medium via the one evaporator to the refrigerant which is evaporated by means of the one evaporator.

Furthermore, it has shown to be particularly advantageous if the refrigerant compressor is configured as an electrically operable refrigerant compressor. The electrically operable refrigerant compressor is also called an electric refrigerant compressor. Here, the electrically operable refrigerant compressor comprises at least one conveying element, by means of which the refrigerant can be conveyed and compressed. Furthermore, the electrically operable refrigerant compressor comprises an electric motor, by means of which the conveying element can be driven.

A second aspect of the invention relates to a motor vehicle, in particular a car, having at least one cooling device according to the invention. Advantages and advantageous refinements of the cooling device according to the invention are to be considered to be advantages and advantageous refinements of the motor vehicle according to the invention, and vice versa.

The motor vehicle is preferably configured as a hybrid or electric vehicle. Here, the motor vehicle comprises, for example, at least one electric machine, by means of which the motor vehicle can be driven. In order to drive the motor vehicle, the electric machine is operated in motor operation and therefore as an electric motor. To this end, the electric machine is fed in its motor operation with electric energy or electric current which is stored in the abovementioned energy store. Here, the configuration of the refrigerant compressor as an electrically operable refrigerant compressor is advantageous in so far as the refrigerant compressor can also be operated, for example, when the electric machine and/or an internal combustion engine for driving the motor vehicle are/is deactivated. Furthermore, as a result, particularly needs-oriented operation of the refrigerant compressor and therefore of the cooling device overall can be realized, with the result that efficient operation can be produced.

Other objects, advantages and novel features of the present invention will become apparent from the following detailed description of one or more preferred embodiments when considered in conjunction with the accompanying drawings.

DETAILED DESCRIPTION OF THE DRAWINGS

Identical or functionally identical elements are provided with identical designations in the figures.

Figure 1:
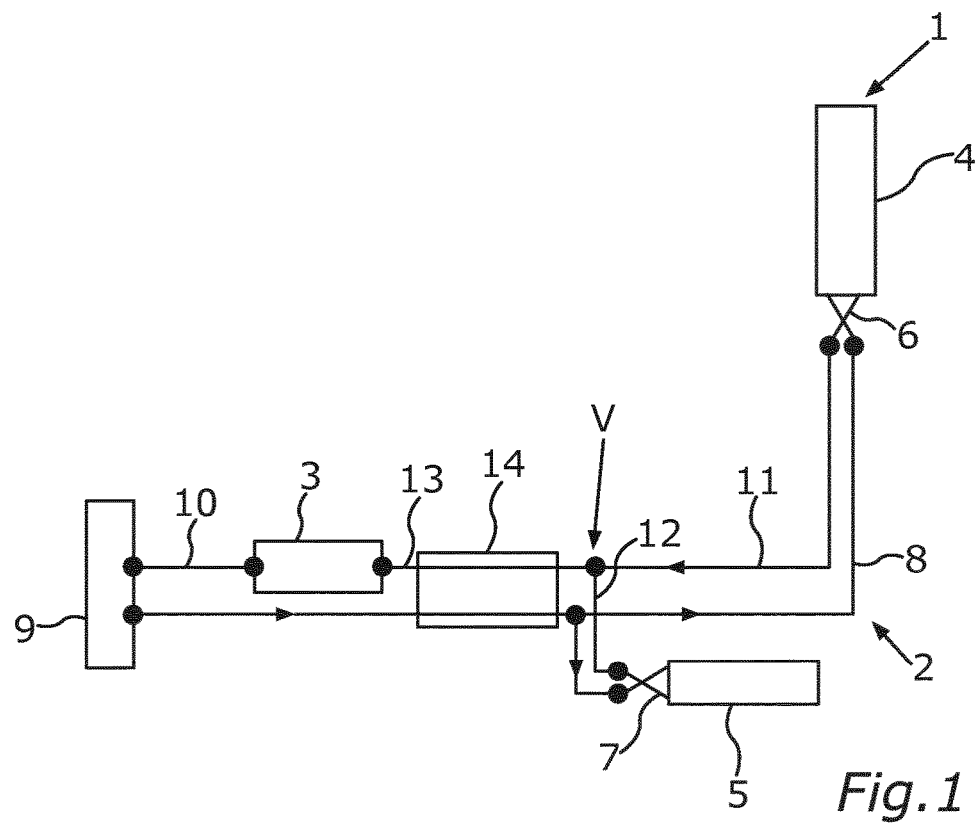
FIG. 1 is a diagrammatic illustration of a cooling device for a motor vehicle, FIG. 1 serving to explain the background of the invention.

FIG. 1 shows a diagrammatic illustration of a cooling device 1 for a motor vehicle, in particular for a car such as a passenger car. The cooling device 1 comprises a refrigerant circuit 2, through which a refrigerant can flow, and a refrigerant compressor 3 which is arranged in the refrigerant circuit 2 and is configured as an electrically operable refrigerant compressor (eKMV). During operation of the cooling device 1, the refrigerant is conveyed through the refrigerant circuit 2 by way of the refrigerant compressor 3. The refrigerant is compressed by the refrigerant compressor 3.

Furthermore, the cooling device 1 comprises a first evaporator 4 which is arranged in the refrigerant circuit 2 and a second evaporator 5 which is arranged in the refrigerant circuit 2, it being possible for the refrigerant to be evaporated by means of the respective evaporators 4 and 5. The evaporator 4 is assigned, for example, to the interior compartment of the motor vehicle, with the result that the interior compartment can be temperature controlled, in particular cooled, by means of the evaporator 4. The refrigerant, for example, can flow through the evaporator 4, and a medium which is different than the refrigerant can flow around said evaporator 4. The medium is, for example, air which is to be fed to the interior compartment. If the refrigerant is evaporated by means of the evaporator 4, a thermal transfer from the medium which flows around the evaporator 4 to the refrigerant can take place via the evaporator 4, as a result of which the medium or the air which is to be fed to the interior compartment is cooled. If the air is then fed to the interior compartment, the interior compartment can thus be cooled or climate controlled. Here, the first evaporator 4 is assigned a first expansion valve 6, by means of which the refrigerant is, for example, relieved or expanded. It is provided, for example, that the refrigerant is fed to the first evaporator 4 via the first expansion valve 6 and the refrigerant is discharged from the evaporator 4 via the first expansion valve 6.

The second evaporator 5 is assigned, for example, to a component of the motor vehicle which is configured as an energy store, and is also called a chiller. Said component is, for example, an energy store which is configured for storing electric energy or electric current and is configured, in particular, as a high voltage energy store (HV energy store). In particular, the energy store is configured as a battery or as a high voltage battery (HV battery). The motor vehicle is configured, for example, as a hybrid or electric vehicle and comprises at least one electric machine, by means of which the motor vehicle can be driven. To this end, the electric machine is operated in motor operation and therefore as an electric motor. In order to operate the electric machine in motor operation, the electric machine is supplied with electric energy which is stored in the energy store.

Here, for example, the energy store is arranged in a cooling circuit (not shown in the figures), through which a cooling medium can flow. The cooling medium is, for example, a cooling liquid. For example, the cooling medium can flow through the energy store, with the result that a thermal transfer can take place from the energy store to the cooling medium. As a result, the energy store is cooled, and the cooling medium is heated. In order to cool the cooling medium, the evaporator 5 is utilized. The cooling medium can, for example, flow on, around or through the evaporator 5, with the result that a thermal transfer from the cooling medium to the refrigerant can take place via the evaporator 5 if, for example, the refrigerant is evaporated by means of the evaporator 5. As a result, the cooling medium is cooled.

Here, the second evaporator 5 is assigned a second expansion valve 7, by means of which the refrigerant is expanded or relieved. It is provided, for example, that the refrigerant which is to be fed to the evaporator 5 is fed to the evaporator 5 via the expansion valve 7, and that the refrigerant is discharged from the evaporator 5 via the expansion valve 7.

Here, the refrigerant circuit 2 comprises at least one feed line 8, via which the refrigerant can be fed or is fed to the respective expansion valve 6 or 7 and therefore to the respective evaporator 4 or 5. In other words, the feed line 8 is utilized to conduct the refrigerant, in particular coming from the refrigerant compressor 3, toward the respective evaporator 4 or 5. The refrigerant flows through the feed line 8 in the liquid state, for example, with the result that the feed line 8 is, for example, a liquid line or is called a liquid line. As a result of evaporation of the refrigerant, the refrigerant is gaseous, for example.

Furthermore, the cooling device 1 comprises a cooling device which is arranged in the refrigerant circuit 2, is configured, for example, as a condenser 9, and by means of which the refrigerant can be cooled. It can be seen from FIG. 1 that the evaporators 4 and 5 are arranged or connected parallel to one another, with the result that, during operation of the cooling device 1, the refrigerant flows through the evaporators 4 and 5 in parallel and/or at the same time. In the flow direction of the refrigerant which flows through the refrigerant circuit 2, the condenser 9 is arranged between the refrigerant compressor 3 and the respective evaporator 4 or 5, that is to say downstream of the refrigerant compressor 3 and upstream of the respective evaporator 4 or 5. Therefore, coming from the refrigerant compressor 3, the refrigerant flows first of all through the condenser 9 and then to the respective evaporator 4 or 5.

The refrigerant is gaseous, for example, downstream of the respective evaporator 4 or 5 and upstream of the refrigerant compressor 3, and flows in the gaseous state to the refrigerant compressor 3 or is conveyed by means of the refrigerant compressor 3. The refrigerant is compressed and, for example, heated by the refrigerant compressor 3, with the result that the refrigerant is present as a hot gas in a line 10 which is arranged in the refrigerant circuit 2 and by way of which the refrigerant is conducted from the refrigerant compressor 3 to the condenser 9, or said refrigerant flows through the line 10 as a hot gas. Therefore, the line 10 is a hot gas line, for example. By means of the line 10, the refrigerant is conducted from the refrigerant compressor 3 to the condenser 9, by which the refrigerant is condensed or liquefied. This means that the refrigerant flows, downstream of the evaporators 4 and 5, to the refrigerant compressor 3, as a result of which the refrigerant circuit 2 is closed.

In the case of the exemplary embodiment which is illustrated in FIG. 1, the cooling device 1 has precisely two evaporators 4 and 5. Here, a suction line 11 and 12 is provided per evaporator 4 and 5, respectively, by which suction line 11 and 12 the refrigerant is conducted from the respective evaporator 4 and 5, respectively, to the refrigerant compressor 3 or in the direction of the refrigerant compressor 3. Here, the suction line 11 is a first suction line which is assigned to the first evaporator 4 and by means of which the refrigerant is conducted from the first evaporator 4 to the refrigerant compressor 3 or in the direction of the refrigerant compressor 3. The suction line 12 is a second suction line which is assigned to the second evaporator 5 and by means of which the refrigerant, coming from the second evaporator 5, is conducted to the refrigerant compressor 3 or in the direction of the refrigerant compressor 3. This means that the refrigerant is discharged by means of the respective suction line 11 and 12 from the respective evaporator 4 and 5, respectively, in particular from the respective expansion valve 6 and 7, respectively, and is conducted towards the refrigerant compressor 3.

Moreover, the cooling device 1 has a main line 13 which is arranged in the refrigerant circuit 2 and is connected fluidically to the suction lines 11 and 12 at a connecting point V. The respective suction line 11 and 12 is also called a part section, the main line 13 also being called a main section. The main line 13 is a line which is common to the suction lines 11 and 12, since the suction lines 11 and 12 are combined, in particular at the connecting point V, to form the main line 13 (main section). As a result, the refrigerant which flows through the respective suction lines 11 and 12 can flow out of the suction lines 11 and 12 and into the main line 13, with the result that, for example, respective part mass flows of the refrigerant which flows through the suction lines 11 and 12 are united in the main line 13 and form a total refrigerant mass flow as a result.

It can be seen from FIG. 1 that the evaporators 4 and 5 are therefore attached via the suction lines 11 and 12 and the main line 13 to the refrigerant compressor 3. Here, the connecting point V is a node, at which the part sections are combined to form the main section which is common to the part sections. A respective flow cross section, through which the refrigerant can flow, in particular a diameter, of the respective suction line 11 and 12 and the main line 13 is given an upper limit, for example, by way of installation space and weight specifications and/or by way of a stipulation for a minimum flow velocity, at which the refrigerant is to flow through the respective suction line 11 and 12 and through the main line 13. The refrigerant is, for example, R134a, R1234yf or R744, or CO2. An oil return means is required in the refrigeration circuit in order to lubricate the refrigerant compressor 3. This is critical, in particular, at low flow velocities in the suction line. Within the context of the oil return means, oil is used, by which the refrigerant compressor 3 is lubricated.

In the case of the exemplary embodiment which is shown in FIG. 1, the cooling device 1 comprises a heat exchanger 14 which is common to the evaporators 4 and 5 and is configured as an inner heat exchanger. The inner heat exchanger is also called an internal heat exchanger (IWT). In the case of the exemplary embodiment which is illustrated in FIG. 1, the heat exchanger 4 is arranged in the main line 13, with the result that the refrigerant which flows or flows back from at least one of the evaporators 4 and 5 to the refrigerant compressor 3 can flow through the heat exchanger 14. In the present case, the total refrigerant mass flow can flow through the heat exchanger 14, with the result that both the refrigerant which comes from the evaporator 4 and the refrigerant which comes from the evaporator 5 flow through the heat exchanger 14 which is common to the evaporators 4 and 5. Moreover, the heat exchanger 14 is arranged in the feed line 8, the heat exchanger 14 being arranged in the feed line 8 upstream of the evaporators 4 and 5. In the main line 13, the heat exchanger 14 is arranged downstream of the evaporators 4 and 5. As a result, an exchange of heat can take place between the refrigerant which flows through the main line 13 and therefore flows from the evaporators 4 and 5 to the refrigerant compressor 3 and the refrigerant which flows through the feed line 8 and in the process comes from the condenser 9 and flows toward the evaporators 4 and 5, as a result of which particularly efficient operation can be produced.

In the case of the exemplary embodiment which is illustrated in FIG. 1, it is provided that, in the flow direction of the refrigerant which flows from the evaporators 4 and 5 to the refrigerant compressor 3, the heat exchanger 14 is arranged between the connecting point V and the refrigerant compressor 3 in relation to the main line 13, that is to say downstream of the connecting point V and upstream of the refrigerant compressor 3. Therefore, the refrigerant which comes from the evaporators 4 and 5 or from the expansion valves 6 and 7 is first of all combined at the connecting point V in the main line 13 and then flows through the heat exchanger 14. Efficiency disadvantages can be produced from this, since excessively high pressure losses of the refrigerant can occur.

Figure 2:
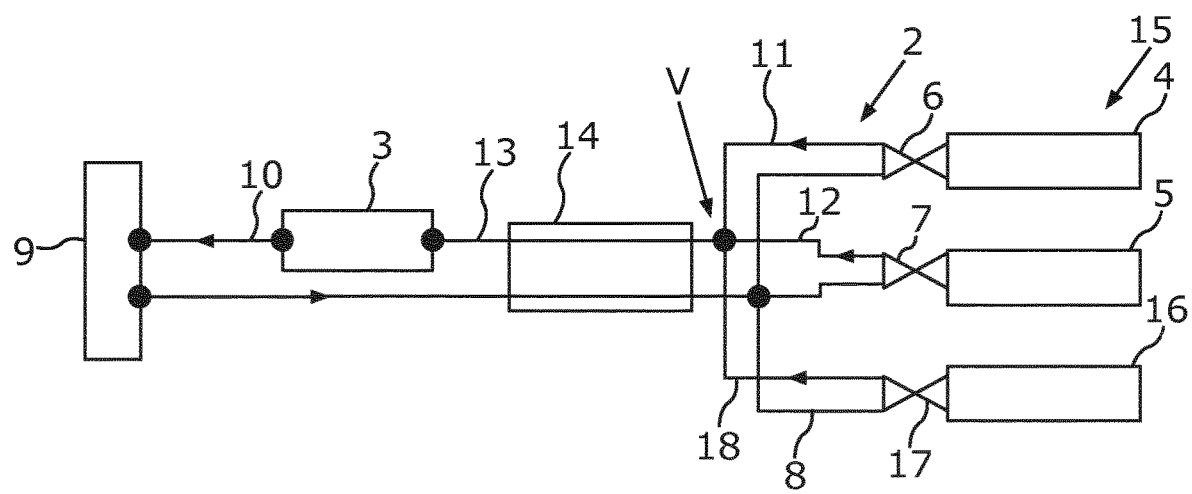
FIG. 2 is a diagrammatic illustration of a further cooling device for a motor vehicle, FIG. 2 serving to explain the background of the invention.

FIG. 2 shows a further cooling device which is denoted by 15 and the function of which corresponds fundamentally to the function of the cooling device 1. The cooling device 15 differs from the cooling device 1, in particular, in that the cooling device 15 comprises a third evaporator 16 for evaporating the refrigerant and a third expansion valve 17 which is assigned to the third evaporator 16 for relieving or expanding the refrigerant. Here, the evaporator 16 and the expansion valve 17 are arranged in the refrigerant circuit 2. Furthermore, the cooling device 15 comprises a third suction line 18 which is arranged in the refrigerant circuit 2, is assigned to the evaporator 16 and the expansion valve 17, and is connected fluidically to the main line 13 at a combining point. Here, the combining point coincides with the connecting point V, with the result that the connecting point V is the combining point or vice versa. In the case of the cooling device 15, the internal heat exchanger 14 is also arranged upstream of the refrigerant compressor 3 and downstream of the connecting point V (combining point) in relation to the main line 13 or in relation to the refrigerant which flows from the evaporators 4, 5 and 16 to the refrigerant compressor 3. This results in efficiency disadvantages.

Figure 3:
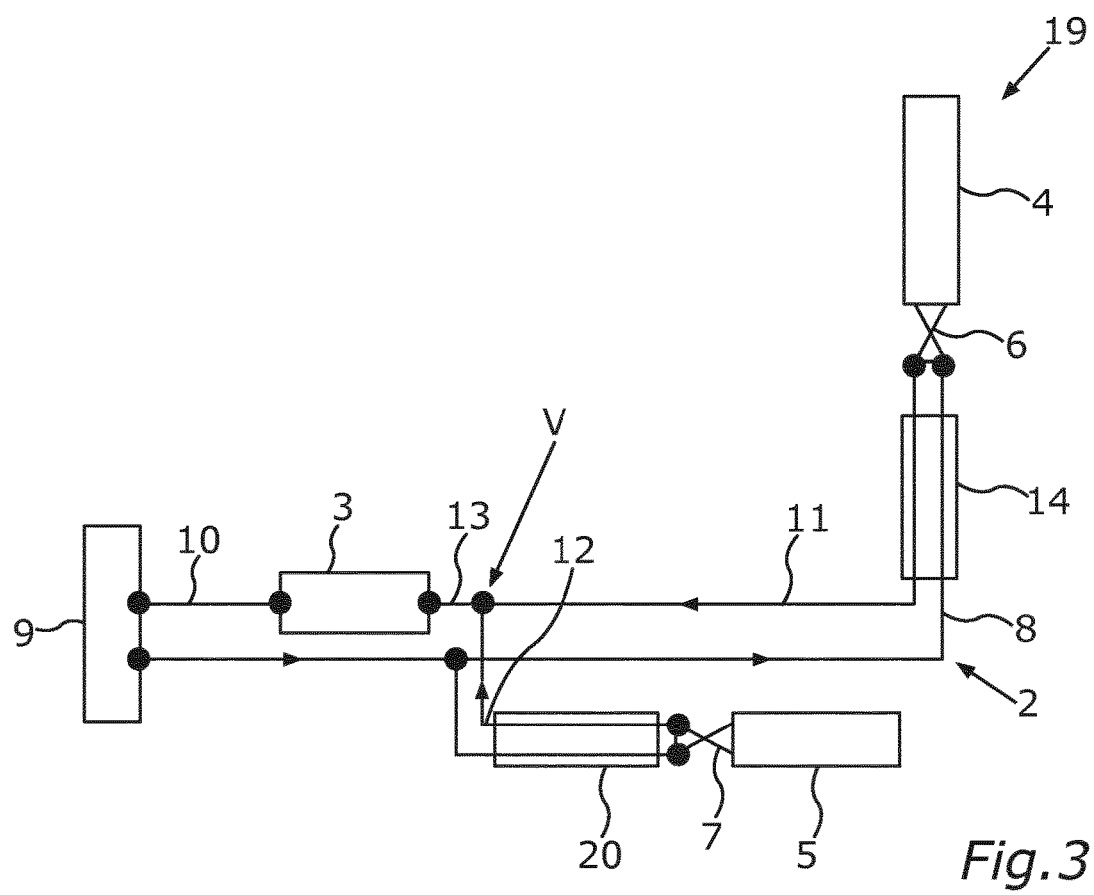
FIG. 3 is a diagrammatic illustration of a first embodiment of a cooling device according to the invention.

FIG. 3 shows a first embodiment of a cooling device 19, by means of which the efficiency disadvantages which were described above in conjunction with the cooling devices 1 and 15 can be avoided. It can be seen from a combined view of FIGS. 1 and 3 that the cooling device 19 proceeds from the cooling device 1 or its construction. In the case of the cooling device 19, the heat exchanger 14 is arranged as a first heat exchanger in the suction line 11 and in the feed line 8. Furthermore, the cooling device 19 comprises a second heat exchanger 20 which is different, for example, than the first heat exchanger 14, is provided in addition to the latter, and is arranged in the suction line 12 which is separated at least partially from the suction line 11 and in the feed line 8. In the flow direction of the refrigerant which flows through the respective suction line 11 and 12, the respective heat exchanger 14 and 20, respectively, is arranged in the respective suction line 11 and 12, respectively, upstream of the connecting point V. The result is that the connecting point V is arranged downstream of the heat exchangers 14 and 20 and upstream of the refrigerant compressor 3. As a result, the main line 13 can be of particularly short and streamlined configuration, with the result that excessive pressure losses can be avoided.

Figure 4:
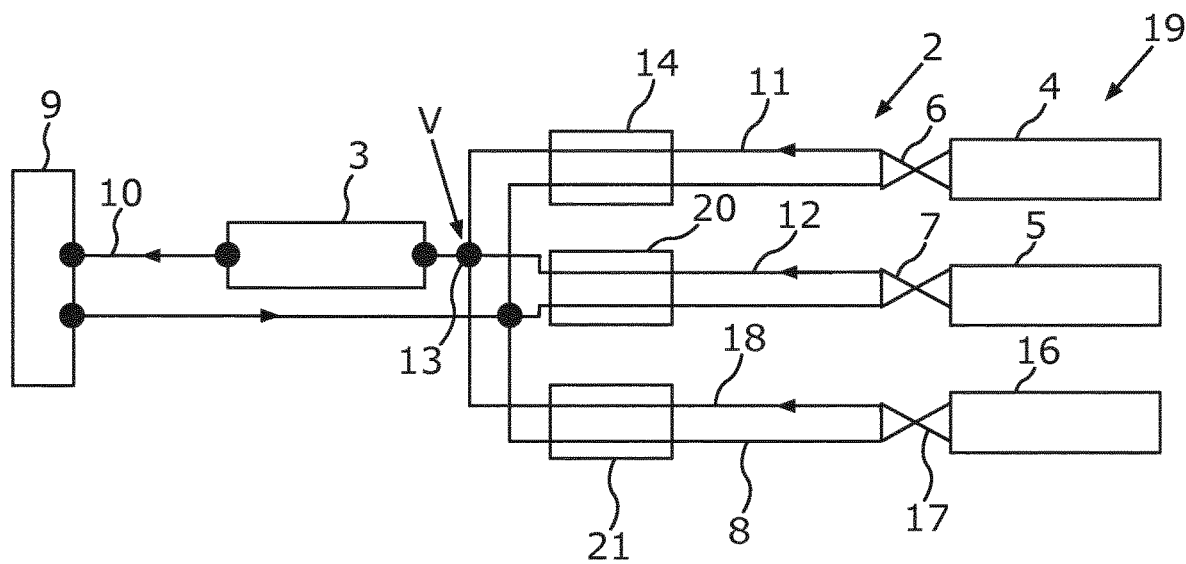
FIG. 4 is a diagrammatic illustration of a second embodiment of the cooling device according to the invention.

FIG. 4 shows a second embodiment of the cooling device 19, the second embodiment of the cooling device 19 being based on the cooling device 15 or proceeding therefrom. The second embodiment comprises a third heat exchanger 21 which is different than the heat exchangers 14 and 20 and is provided in addition to the latter, the heat exchangers 14, 20 and 21 being configured as internal or inner heat exchangers. The third heat exchanger 21 is arranged both in the third suction line 18 and in the feed line 8, and therefore refrigerant which flows toward the evaporator 16 and flows away from the evaporator 16 and flows to the refrigerant compressor 3 flows through said third heat exchanger 21. In a corresponding manner to this, refrigerant which flows toward the evaporator 5 and refrigerant which flows from or away from the evaporator 5 and in the process flows to the refrigerant compressor 3 flows through the heat exchanger 20. In a corresponding manner to this, refrigerant which flows via the feed line 8 toward the evaporator 4 and refrigerant which flows from or away from the evaporator 4 via the suction line 11 and in the process flows toward the refrigerant compressor 3 flows through the heat exchanger 14.

In a further, third embodiment (not shown in the figures), it can be provided that, for example, the third heat exchanger 21 is omitted, the second heat exchanger 20 then being a heat exchanger which is common to the evaporators 5 and 16 and, for example, is arranged both in the suction line 12 and in the suction line 18 and in the feed line 8. In other words, if the number of evaporators is x, for example, x-1 evaporators are assigned, for example, to a common inner heat exchanger, the remaining evaporator being equipped with a dedicated internal heat exchanger. Furthermore, it is contemplated to dispense entirely with an inner heat exchanger in at least one part section.

LIST OF DESIGNATIONS

1 Cooling device
2 Refrigerant circuit
3 Refrigerant compressor
4 Evaporator
5 Evaporator
6 Expansion valve
7 Expansion valve
8 Feed line
9 Condenser
10 Line
11 Suction line
12 Suction line
13 Main line
14 Heat exchanger
15 Cooling device
16 Evaporator
17 Expansion valve
18 Suction line
19 Cooling device
20 Heat exchanger
21 Heat exchanger
V Connecting point The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling device for a motor vehicle having a refrigerant circuit through which a refrigerant can flow, comprising:
   a refrigerant compressor arranged in the refrigerant circuit;
   a first evaporator arranged in the refrigerant circuit for evaporating the refrigerant;
   at least one second evaporator arranged in the refrigerant circuit for evaporating the refrigerant;
   a first suction line arranged in the refrigerant circuit for conducting the refrigerant from the first evaporator to the refrigerant compressor;
   a second suction line arranged in the refrigerant circuit and separated at least partially from the first suction line for conducting the refrigerant from the second evaporator to the refrigerant compressor;
   a main line arranged in the refrigerant circuit and connected fluidically to the first and second suction lines at a connecting point for conducting the refrigerant from the first and second suction lines to the refrigerant compressor; and
   at least one heat exchanger arranged in the refrigerant circuit through which heat exchanger the refrigerant, flows from at least one of the evaporators to the refrigerant compressor, can flow, wherein
   the at least one heat exchanger is arranged in at least one of the first and second suction lines, the connecting point being arranged downstream of the at least one heat exchanger.

2. The cooling device as claimed in claim 1, wherein
   the at least one suction line is the first suction line,
   a second heat exchanger is arranged in the second suction line, and
   the connecting point is arranged downstream of the second heat exchanger.

3. The cooling device as claimed in claim 2, further comprising:
   a third evaporator arranged in the refrigerant circuit for evaporating the refrigerant; and
   a third suction line arranged in the refrigerant circuit for conducting the refrigerant from the third evaporator to the refrigerant compressor, wherein
   the main line is connected fluidically to the third suction line at a combining point for conducting the refrigerant from the first, second and third suction lines to the refrigerant compressor, and
   the combining point is arranged downstream of the at least one heat exchanger and downstream of the second heat exchanger.

4. The cooling device as claimed in claim 3, wherein
   the second heat exchanger, which is common to the second evaporator and the third evaporator, is arranged in the third suction line.

5. The cooling device as claimed in claim 3, wherein
   a third heat exchanger is arranged in the third suction line, the connecting point and the combining point being arranged downstream of the third heat exchanger.

6. The cooling device as claimed in claim 3, wherein
   the combining point coincides with the connecting point.

7. The cooling device as claimed in claim 1, wherein
   the main line has an internal diameter which lies in a range from 14 millimeters inclusive to 20 millimeters inclusive.

8. The cooling device as claimed in claim 1, wherein
   the main line has a length of at most 1000 millimeters.

9. The cooling device as claimed in claim 8, wherein
   the length of the main line is less than 500 millimeters.

10. The cooling device as claimed in claim 8, wherein
    the length of the main line is less than 150 millimeters.

11. The cooling device as claimed in claim 1, wherein
    the refrigerant which flows to at least one of the evaporators is flowable through the heat exchanger.

12. The cooling device as claimed in claim 1, wherein
    one of the evaporators is assigned to an energy store of the motor vehicle which is configured for storing electric energy, and
    another one of the evaporators is assigned to an interior compartment of the motor vehicle, whereby the energy store is temperature controllable by the one evaporator and the interior compartment is temperature controllable by the other evaporator.

13. The cooling device as claimed in claim 1, wherein
    the refrigerant compressor is configured as an electrically operable refrigerant compressor.

14. A motor vehicle, comprising at least one cooling device as claimed in claim 1.

* * * * *